United States Patent

[11] 3,610,674

[72] Inventor Hans-Georg Janssen
 Bremerhaven, Germany
[21] Appl. No. 2,085
[22] Filed Jan. 12, 1970
[45] Patented Oct. 5, 1971
[73] Assignee Aktiengesellschaft "Weser"
 Bremen, Germany
[32] Priority Jan. 18, 1969
[33] Germany
[31] P 19 02 416.9

[54] SLIP HOOK
 7 Claims, 2 Drawing Figs.
[52] U.S. Cl. .................................................. 294/83,
  294/75, 294/86.18, 294/88, 294/101
[51] Int. Cl. .............................................. B66c 1/34
[50] Field of Search .......................................... 294/75, 83,
  84, 76, 86.18, 88, 101

[56] References Cited
 UNITED STATES PATENTS
3,171,552 3/1965 Warrington .................. 294/88 X
3,341,244 9/1967 Johnson ........................ 294/75

FOREIGN PATENTS
410,395 3/1925 Germany ...................... 294/83
Primary Examiner—Harvey C. Hornsby
Assistant Examiner—Merle F. Maffei
Attorney—Michael S. Striker ABSTRACT: A slip hook has a body portion having a general plane. A hook portion comprises a hooked first arm having a free tip and a second arm extending from the first arm. An arcuately curved abutment face is provided on the second arm. Latch means is provided on the body portion and mounting means mounts the hook portion on the body portion for pivotal movement about a pivot axis between two positions in one of which the abutment face is located within the outline of the body portion and the first arm projects substantially normal to the general plane and in the other of which the abutment face and the curved arm both project beyond the general plane and are located in a common plane defining with the general plane an obtuse angle. Actuating means is provided for moving the latch means between two positions in one of which it displaces the hook portion to the first-mentioned position.

PATENTED OCT 5 1971 3,610,674

INVENTOR
HANS-GEORG JANSSEN
BY
ATTORNEY

SLIP HOOK

BACKGROUND OF THE INVENTION

The present invention relates generally to slip hooks and more particularly to an improved slip hook construction.

Slip hooks are used, particularly in marine applications, where it is essential to provide for a rapid changeover between two operative modes of the hook, in which a rope, line or the like is respectively engaged by the hook or engageable thereby, and released by the hook or no longer engageable by the same. Such hooks are well known and the term slip hook clearly identifies to those skilled in the art the particular type of hook with which the present invention is concerned.

Generally speaking, slip hooks comprise a body portion, a hook portion pivotably mounted on the body portion so that it can move between two positions relative to the body portion in one of which it is in position to engage and retain a rope, line or the like, hereafter for the sake of simplicity called a rope, and in the other of which it releases the once-engaged rope or will not engage such a rope which it may encounter. A latch arrangement is provided for maintaining the hook portion in operative position in which it is capable of engaging and retaining a rope, and then actuating device—usually a piston an cylinder unit—acts upon the latch arrangement to disengage the same from the hook portion when it is desired that the latter be "slipped," that is that it be permitted to move to the position in which it releases an engaged rope or will not engage a rope which it encounters. The problem with these prior art devices is that once the hook portion has been released by the latch arrangement, that is once it has been "slipped," it must be manually returned to operative position where it is then engaged again by the latch arrangement and retained. This is of no particular consequence in some instances, including instances where the slip hook is relatively small and light in weight. However, many slip hooks are large and very heavy and under these circumstances the return of the hook portion manually to operating position is very difficult. In addition, in the known constructions the hook portion even when slipped is still so positioned with reference to the body portion that it engages a rope which it encounters, and that the rope must then slip off the tip of the hook portion rather than freely passing over the same. In this context it must be remembered that slip hooks are frequently dragged through water in which ropes for similar lines may float, be strung or lie on the bottom. Depending upon the requirements of a particular application it may be desirable that the slip hook either pass over such lines which it encounters, without engaging them, or that it engage and retain them.

SUMMARY OF THE INVENTION

It is, accordingly, an object of the present invention to overcome the aforementioned disadvantages.

More particularly it is an object of the present invention to provide an improved slip hook which is not possessed of these disadvantages.

An additional object of the invention is to provide such a slip hook which while possessed of great mechanical strength also provides for return of the hook portion from the slipped position to operating position by means of the actuating arrangement which acts upon the latching arrangement.

A concomitant object of the invention is to provide such a hook wherein the hook portion is capable of moving to a slipped position in which it will not engage a rope or analogous element which it encounters, even if the encounter takes place under a flat angle of the slip hook with reference to the rope or analogous element.

In pursuance of the above objects, and others which will become apparent hereafter, the novel construction comprises, briefly stated, a body portion having a general plane and a hook portion comprising a hooked first arm having a free tip and a second arm extending from the first arm. An arcuately curved abutment face is provided on the second arm and a latch means is provided on the body portion. Mounting means mounts the hook portion on the body portion for pivotal movement about a pivot axis between a first position in which the abutment face is located within the outline of the body portion and the first arm projects substantially normal to the general plane, and a second position in which the abutment face and the first arm both project beyond the general plane and are located in a common plane defining with the general plane an obtuse angle. Actuating means on the body portion serves for moving the latch means between two positions in one of which it displaces the hook portion to its first position.

According to the invention it is advantageous if the latch means is provided with a recess accommodating the abutment face when the hook portion is in its first position. Such a construction has its mechanical strength reinforced thereby, when the hook portion is in first position. It is further advantageous to provide an engagement projection or nose on the latch means, and to configurate this nose with a guide face cooperating with the abutment face, because this permits a more compact construction of the device and reduces the number of elements required. The actuating means may be a hydraulically operated piston and cylinder unit, but it may also be a pneumatically operated unit. It is particularly advantageous if the unit is connected with the body portion for pivotal movement about an axis paralleling the pivot axis of the hook portion and intersecting the piston and cylinder unit approximately midpoint of its greatest length, that is with the midpoint being measured when the piston is extended out of the cylinder to the maximum extent.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
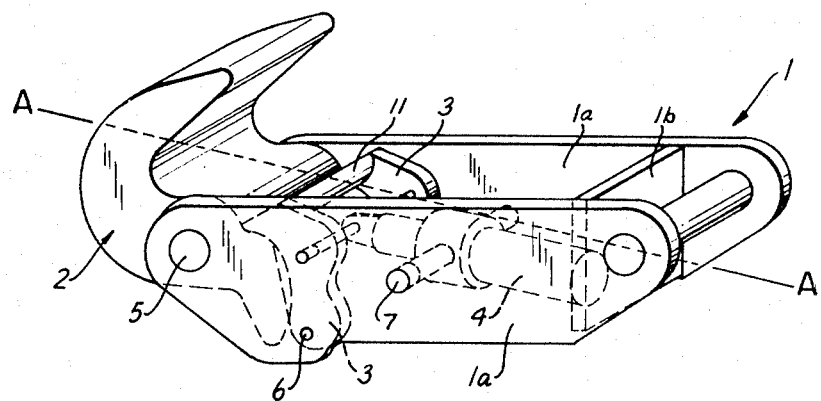
FIG. 1 is a perspective view of the inventive device in operative position.

Discussing now the drawing in detail it will be seen that reference numeral 1 generally identifies the main body portion of the illustrated slip hook. In the illustrated embodiment the main body portion comprises two transversely spaced elements 1a which are connected by a plurality of transverse connectors 1b. Only some of the transverse connectors 1b are shown but it will be appreciated that many will be provided, and that they will be located as necessary to obtain the desired structural strength. This of course is well known to those skilled in the art and does not in itself form a part of the present invention.

Figure 2:
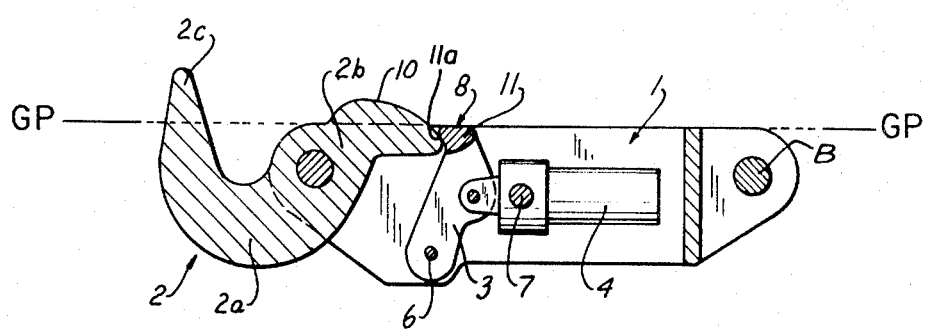
FIG. 2 is a side view of the device in FIG. 1, but in slipped position.

Mounted in the body portion 1 for pivotal movement about a shaft 5 defining a pivot axis is a solid hook portion 2 having a first arm 2a provided with a free tip 2c, and a second arm 2b which projects from the first arm 2a. This is shown in FIG. 2.

Also mounted in the body portion 1 are a latching arrangement 3 which is pivotable about the pivot axis 6 and in the illustrated embodiment may comprise two latching portions located respectively inwardly adjacent the sections 1a and connected by suitable transverse connectors, and a cylinder and piston unit 4 which is pivotably connected to the body portion 1 for pivoting movement about a pivot axis 7. The axis 5, 6 and 7 all extend in at least substantial parallelism with one another.

The latching arrangement 3 is provided with a projection or nose 8 facing towards the arm 2b and cooperating with a contact face 9 provided on the arm 2b (See FIG. 1). Extending from the contact face 9 of the arm 2b is an arcuately curved abutment face 10 which cooperates with a corresponding guide face 11a on the latching arrangement 3. Reference numeral 11 identifies a transverse connector which in the illustrated embodiment connects the two laterally or transversely spaced latching portions of the arrangement with one another and also serves as a reinforcement. It constitutes or is provided with the guide face 11a cooperating with the abutment face 10 on the arm 2b which, in the position shown in FIG. 1, extends between the two transversely spaced portions of the arrangement 3 (compare the broken-line showing of the abutment face 10 in FIG. 1) and thus serves in this position to reinforce and stabilize the construction.

In the position shown in FIG. 1 the hook portion 2 is capable of engaging a rope or similar element which it contacts, assuming that a chain or the like is connected to the transverse connector of the body portion 1 which also defines the pivot axis B about which the entire hook can move with reference to the chain, and further assuming that the hook is then dragged and encounters a rope or analogous element extending in the plane A, that is normal to the plane of the drawing.

When the hook is to be "slipped," that is when it is not intended to engage and retain such a rope or analogous element, the cylinder and piston unit 4 is operated so as to retract the piston, shortening the length of the unit and moving the latching arrangement 3 from the position of FIG. 1 to that shown in FIG. 2. Encounter of a rope or analogous element will now displace the hook portion 2 from the position of FIG. 1 to that of FIG. 2, and of course the same will occur if at the time the latch arrangement is moved to the position of FIG. 2 a rope is already engaged by the hook portion 2. In this position the tip 2c and the abutment face 10 are located in a common plane defining an obtuse angle with the general plane GP of the body portion 1, that is the general plane of the edge faces which in FIGS. 1 and 2 are directed upwardly. Note should be taken of how the plane A intersects the tip 2c and the abutment as well as defining an angle with the pivot axis B of the body portion 1.

If it is subsequently desired to return the hook portion 2 to the position shown in FIG. 1, that is the operative position, the cylinder and piston unit is operated so that the piston becomes extended out of the cylinder to the position shown in FIG. 1, thereby displacing the latching arrangement 3 to the position of FIG. 1 and, as it slides along the abutment face 10 and onto the contact face 9, displacing the hook portion 2 from the position of FIG. 2 to that of FIG. 1. Manual operation is no longer necessary.

It will be appreciated that the construction is suitable wherever a need exists for a slip hook, and that it is entirely independent of the particular use to which the hook is put.

It will be understood that each of the elements described above, or two or more together, may also find a useful application in other types of constructions differing from the types described above.

While the invention has been illustrated and described as embodied in a slip hook, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

I claim:

1. A slip hook, comprising a body portion having a general plane; a hook portion comprising a hooked first arm having a free tip and a second arm extending from said first arm; an arcuately curved abutment face on said second arm; latch means on said body portion; mounting means mounting said hook portion on said body portion for pivotal movement about a pivot axis between a first position in which said abutment face is located within the outline of said body portion and said first arm projects substantially normal to said general plane, and a second position in which said abutment face and said first arm both project beyond said general plane and are located in a common plane defining with said general plane an obtuse angle; and actuating means mounted on said body portion and engaging said latch means for moving said latch means between two positions in one of which said actuating means forces said latch means to necessarily displace and hold said hook portion in said first position.

2. A hook as defined in claim 1, wherein said actuating means is a hydraulic cylinder-and-piston unit.

3. A hook as defined in claim 1, wherein said abutment face extends substantially normal to said general plane when said hook portion is in said first position thereof.

4. A hook as defined in claim 1, said latch means comprising a recess; and wherein said abutment face extends into said recess when said hook portion is in said first position thereof.

5. A hook as defined in claim 1, said latch means comprising a guide face positioned and configurated so as to slidingly engage said abutment face during movement of said hook portion between said positions thereof.

6. A hook as defined in claim 5, said latch means being pivotable and having a nose provided with said guide face; and wherein said actuating means comprises a cylinder-and-piston unit connected with said latch means in the region of said nose.

7. A hook as defined in claim 2, said unit being extendable between a minimum retracted length and a maximum extended length, and being mounted to said body portion for pivotal movement about an axis intersecting said unit substantially midway of said maximum extended length.